United States Patent
Yasui et al.

(10) Patent No.: US 9,056,600 B2
(45) Date of Patent: Jun. 16, 2015

(54) MOTION CONTROL DEVICE FOR VEHICLE

(75) Inventors: Yoshiyuki Yasui, Nagoya (JP);
Toshihisa Kato, Handa (JP); Hiroshi Matsuoka, Nisshin (JP); Junya Nagaya, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 354 days.

(21) Appl. No.: 12/729,755

(22) Filed: Mar. 23, 2010

(65) Prior Publication Data

US 2010/0268419 A1 Oct. 21, 2010

(30) Foreign Application Priority Data

Apr. 15, 2009 (JP) .................................. 2009-098655

(51) Int. Cl.
*A01B 69/00* (2006.01)
*B60T 8/1755* (2006.01)

(52) U.S. Cl.
CPC ..................................... *B60T 8/1755* (2013.01)

(58) Field of Classification Search
CPC ............................... B60T 8/1755; B62D 15/02
USPC .................................... 701/36, 41, 70, 72, 87
See application file for complete search history.

(56) References Cited

U.S. PATENT DOCUMENTS

| | | | | |
|---|---|---|---|---|
| 7,229,139 | B2 * | 6/2007 | Lu et al. | 303/140 |
| 7,551,997 | B2 * | 6/2009 | Inage | 701/41 |
| 2004/0046447 | A1 * | 3/2004 | Wanke et al. | 303/140 |
| 2006/0241828 | A1 * | 10/2006 | Yasui et al. | 701/28 |
| 2006/0241833 | A1 | 10/2006 | Yasui et al. | |

FOREIGN PATENT DOCUMENTS

| | | | |
|---|---|---|---|
| JP | 2004-513010 A | 4/2004 | |
| JP | 2006-298209 A | 11/2006 | |

OTHER PUBLICATIONS

Japanese Office Action dated Apr. 9, 2013 issued in the corresponding Japanese Patent Application No. 2009-098655 and English language translation.

* cited by examiner

*Primary Examiner* — John Q Nguyen
*Assistant Examiner* — Jordan S Fei
(74) *Attorney, Agent, or Firm* — Buchanan Ingersoll & Rooney PC

(57) ABSTRACT

A motion control device for a vehicle having a braking means for applying a brake toque to a wheel of the vehicle and maintaining a traveling stability of the vehicle by controlling the braking means, the motion control for the vehicle, includes a steering angular velocity obtaining means for obtaining a steering angular velocity of the vehicle, a maximum steering angular velocity calculating means for calculating a maximum steering angular velocity on the basis of the steering angular velocity, a determining means for determining a reference turning state quantity on the basis of the maximum steering angular velocity, an actual turning state quantity obtaining means for obtaining an actual turning state quantity of the vehicle, and a control means for controlling the brake toque on the basis of the reference turning state quantity and the actual turning state quantity.

13 Claims, 7 Drawing Sheets

MOTION CONTROL DEVICE FOR VEHICLE

CROSS REFERENCE TO RELATED APPLICATIONS

This application is based on and claims priority under 35 U.S.C. §119 to Japanese Patent Application 2009-098655, filed on Apr. 15, 2009, the entire content of which is incorporated herein by reference.

FIELD OF THE INVENTION

The present invention generally relates to a motion control device for a vehicle,

BACKGROUND

Disclosed in JP2006-298209A is a roll increasing tendency estimation apparatus for a vehicle, which determines a roll increasing tendency of the vehicle on the basis of a relationship between plural state quantities. Furthermore, the specification, JP2006-298209A, also discloses a vehicle motion stabilizing control device, which controls at least one of a braking force and a driving force on the basis of the relationship between plural state quantities in order to restrict the roll increasing tendency of the vehicle.

In a case where plural state quantities are used for restricting the roll increasing tendency of a vehicle, in which a relatively great yaw inertia moment or a relatively great roll inertia moment is likely to be generated (e.g. a large-sized commercial vehicle), a phase shift (a phase difference, a temporal difference) between the state quantities may become great. Accordingly, the phase difference may need to be compensated.

A need thus exists to provide a motion control device for a vehicle, which compensates a phase difference and which maintains a stability of the vehicle while a yawing motion and/or a rolling motion occurs at the vehicle.

SUMMARY OF THE INVENTION

According to an aspect of the present invention, a motion control device for a vehicle having a braking means for applying a brake toque to a wheel of the vehicle and maintaining a traveling stability of the vehicle by controlling the braking means, the motion control for the vehicle, includes a steering angular velocity obtaining means for obtaining a steering angular velocity of the vehicle, a maximum steering angular velocity calculating means for calculating a maximum steering angular velocity on the basis of the steering angular velocity, a determining means for determining a reference turning state quantity on the basis of the maximum steering angular velocity, an actual turning state quantity obtaining means for obtaining an actual turning state quantity of the vehicle, and a control means for controlling the brake toque on the basis of the reference turning state quantity and the actual turning state quantity.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of a motion control device for a vehicle will be described below with reference to the attached drawings. Illustrated in FIG. 1 is an entire configuration example of the motion control device for the vehicle according to the embodiment.

Figure 1:
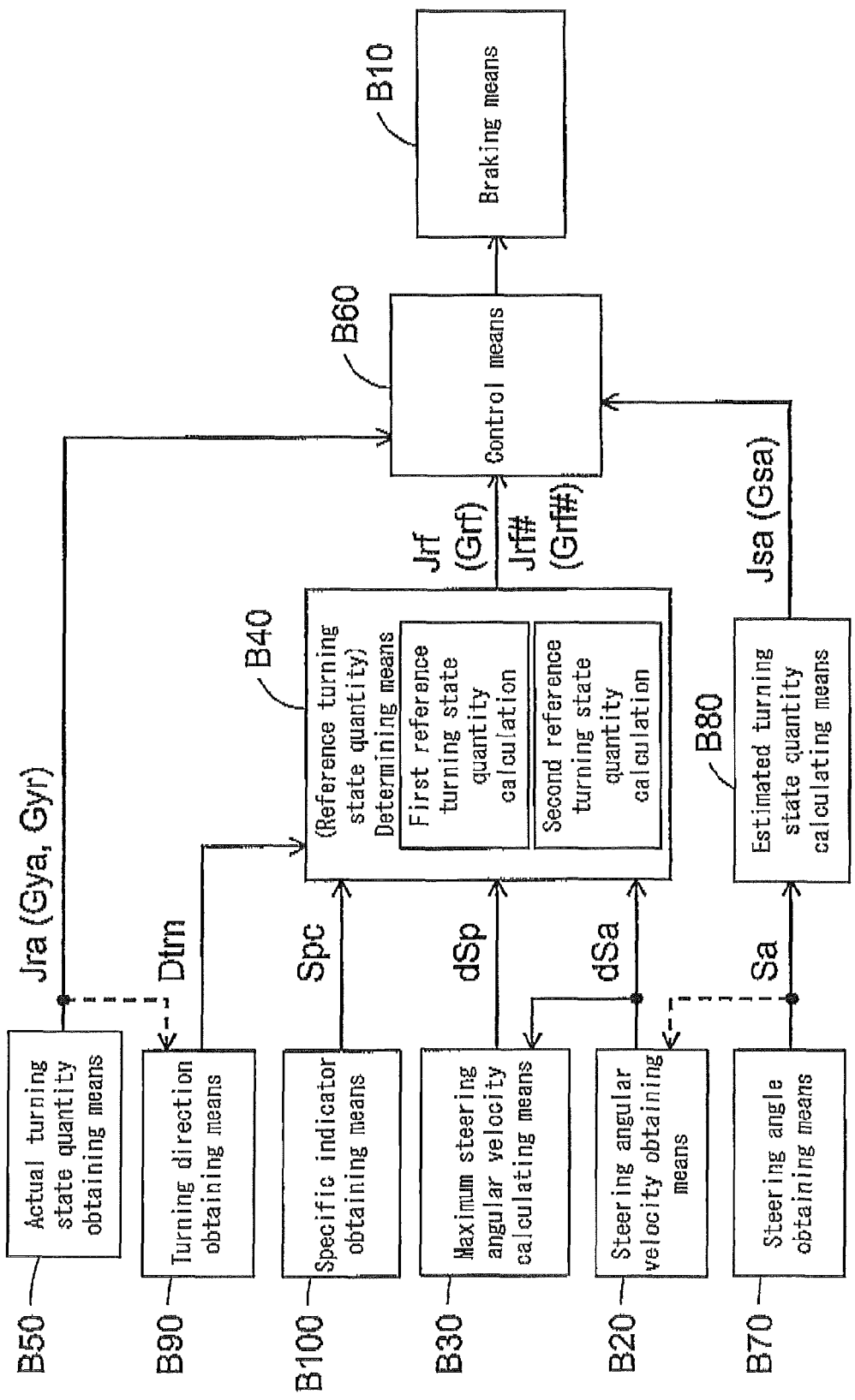
FIG. 1 is a diagram schematically illustrating an entire configuration of a motion control device for a vehicle according to an embodiment.

As illustrated in FIG. 1, the motion control device for the vehicle (which will be hereinafter referred to as a device) includes a braking means B10 for applying a brake torque to a wheel WH of the vehicle, so that the device maintains a traveling stability of the vehicle by controlling the braking means B10. The device further includes a steering angular velocity obtaining means B20 for obtaining a steering angular velocity dSa of the vehicle, a maximum steering angular velocity calculating means B30 for calculating a maximum steering angular velocity dSp (a maximum value of the steering angular velocity) on the basis of the steering angular velocity dSa, a (reference turning state quantity) determining means B40 for determining a reference turning state quantity Jrf (e.g. Grf), Jrf# (e.g. Grf#) (a reference value of a turning state quantity) on the basis of the maximum steering angular velocity dSp, an actual turning state quantity obtaining means B50 for obtaining an actual turning state quantity Jra (Gya and/or Gyr) (an actual value of the turning state quantity) of the vehicle, and a control means B60 for controlling the brake torque to be applied to the wheel WH via the braking means B10 on the basis of the reference turning state quantity Jrf (Grf), Jrf# (Grf#) and the actual turning state quantity Jra (Gya, Gyr). The determining means B40 determines the reference turning state quantity Jrf (Grf), Jrf# (Grf#) in a manner where the greater the maximum steering angular velocity dSp is, the smaller value the reference turning state quantity Jrf (Grf), Jrf# (Grf#) is determined to be, or the smaller the maximum steering angular velocity dSp is, the greater value the reference turning state quantity Jrf (Grf), Jrf# (Grf#) is determined to be. The maximum steering angular velocity calculating means B30 sets the maximum steering angular velocity dSp to zero (0) after a predetermined time tk1 has passed.

In this embodiment, because the reference turning state quantity is calculated on the basis of the maximum steering angular velocity (a peak value of the steering angular velocity), a temporal difference between a timing when the steering angular velocity is generated and a timing when the actual turning state quantity is generated may be compensated. The temporal difference is not that temporarily long. Therefore, the maximum steering angular velocity dSp may be set to zero (0) after the predetermined amount of time has passed.

The control means B60 starts applying the brake torque to the wheel WH when the actual turning state quantity Jra (e.g. Gya and/or Gyr) exceeds the reference turning state quantities Jrf (e.g. Grf), Jrf# (e,g. Grf#). Furthermore, the control means B60 calculates a deviation (a difference) ΔJr between the actual turning state quantity Jra and the reference turning state quantity Jrf, Jrf# (e.g. a deviation (a difference) ΔGy between the turning state quantity Gya, Gyr and the reference turning state quantity Grf, Grf#). Then, the control means B60 determines a target value Pwt of the brake torque on the basis of the deviation ΔJr (ΔGy), Accordingly, because a vehicle stabilizing control is started by using the reference turning state quantity, which is calculated on the basis of the maximum steering angular velocity dSp, and because the brake torque target value Pwt** is determined on the basis of the reference turning state quantity, an appropriate vehicle stabilizing control may be executed.

The device further includes a steering angle obtaining means B70 for obtaining a steering angle Sa of the vehicle and an estimated turning state quantity calculating means B80 for calculating an estimated turning state quantity Jsa (e.g. Gsa) (an estimated value of the turning state quantity) on the basis of the steering angle Sa. In this case, the control means B60 starts applying the brake torque to the wheel WH** via the braking means B10 when the estimated turning state quantity Jsa (Gsa) exceeds the reference turning state quantity Jrf (Grf), Jrf# (Grf#). Accordingly, because the vehicle stabilizing control is executed on the basis of plural turning state quantities, a reliability in an execution of the vehicle stabilizing control may be enhanced.

The device further includes a turning direction obtaining means B90 for obtaining a turning direction Dtrn of the vehicle. In a case where the vehicle is determined to turn in one direction (which will be hereinafter referred to as a first direction, e.g. in a left direction) by the turning direction obtaining means B90, the determining means B40 determines a reference turning state quantity Jrf1 (e.g. Grf1) (a first reference turning state quantity) to be obtained in the case where the vehicle turns in the first direction. Furthermore, when the vehicle is determined to turn in the first direction, the determining means B40 may determine a reference turning state quantity Jrf2 (e.g. Grf2) (a second reference turning state quantity) to be obtained in a case where the vehicle turns in the other direction (e.g. in a right direction, a second direction) opposite to the first direction, on the basis of the reference turning state quantity Jrf1 (Grf1) (the first reference turning state quantity). When considering the turning direction, the first reference turning state quantity is opposite in sign to the second reference turning state quantity, while an absolute value of the first reference turning state quantity and an absolute value of the second reference turning state quantity are determined to be the same value. The turning direction obtaining means B90 may be modified so as to determine and obtain the turning direction Dtrn of the vehicle on the basis of the actual turning state quantity Jra (e.g. Gya and/or Gyr), which is obtained by the actual turning state quantity obtaining means B50. More specifically, the turning direction obtaining means B90 may calculate the turning direction Dtrn on the basis of a sign (either a plus sign or a minus sign) of the actual turning state quantity Jra (Gya, Gyr).

The control means B60 determines the target value Pwt of the brake torque on the basis of the second reference turning state quantity Jrf2 (Grf2) and the actual turning state quantity Jra, (Gya, Gyr) to be obtained when the vehicle turns in the second direction and the control means B60 starts applying the brake torque to the wheel WH via the braking means B10 on the basis of the obtained brake torque target value Pwt in the case where the vehicle turns in the second direction. In other words, the control means B60 starts applying the brake torque to the wheel WH via the braking means B10 when (a degree of) the actual turning state quantity Jra (Gya, Gyr) exceeds the second reference turning state quantity Jrg2 (Grf2). More specifically, the control means B60 calculates the deviation (the difference) ΔJr between the actual turning state quantity Jra and the second reference turning state quantity Jrf2 (e.g. the deviation (the difference) ΔGy between the actual turning state quantity Gya, Gyr and the second reference turning state quantity Grf2), so that the control means B60 determines the target value Pwt of the brake torque to be applied to the wheel WH on the basis of the deviations ΔJr (e.g. ΔGy). Accordingly, because the reference turning state quantity (i.e. the second reference turning state quantity Jrf1 (Grf1)) to be generated when the turning operation (which corresponds to a second steering operation) is performed is determined beforehand while a transitional steering operation, which may deteriorate the vehicle stability, is being performed, the vehicle stability may be surely ensured.

The device further includes a specific indicator obtaining means B100 for obtaining a specific indicator Spc of the vehicle relating to at least one of a yawing motion and a rolling motion of the vehicle. The specific indicator Spc includes information relating to at least one of a weight Wvh of the vehicle, a position of a center of gravity of the vehicle (i.e. a distance Lcg between the center of gravity and a front wheel axle, a height Hcg of the center of gravity) and an inertia moment (i,e, a yaw inertia moment Iz, a roll inertia moment Ix). The determining means B40 determines the reference turning state quantity Jrf (e.g. Grf), Jrf# (e.g. Grf#) on the basis of the specific indicator Spc. More specifically, the determining means B40 adjusts and determines the reference turning state quantity Jrf (Grf), Jrf# (Grf#) in a manner where, in a case where the specific indicator Spc is great, the reference turning state quantity Jrf (Grf), Jrf# (Grf#) is determined to be a relatively small value, or in a case where the specific indicator Spc is small, the reference turning state quantity Jrf (Grf), Jrf# (Grf#) is determined to be a relatively great value. The "specific indicator Spa being great (small)" means that a value of at least one of the weight Wvh of the vehicle, the distance Lcg from the front wheel axle to the center of gravity, the height Hcg of the center of gravity, the yaw inertia moment Iz and the roll inertia moment Ix is relatively great (small).

Accordingly, because the reference turning state quantity Jrf (Grf), Jrf# (Grf#) is determined on the basis of the specific indicator Spc, which indicates a specification of the vehicle, the control is surely executed to the vehicle, whose stability is likely to be deteriorated, so that the stability of the vehicle is ensured. On the other hand, an unnecessary intervention of the control may be avoided for the vehicle, whose stability is likely to be maintained. In other words, the vehicle stabilizing control may be adjusted so as to be suitable to any vehicle (any vehicle having different specification).

Figure 2:
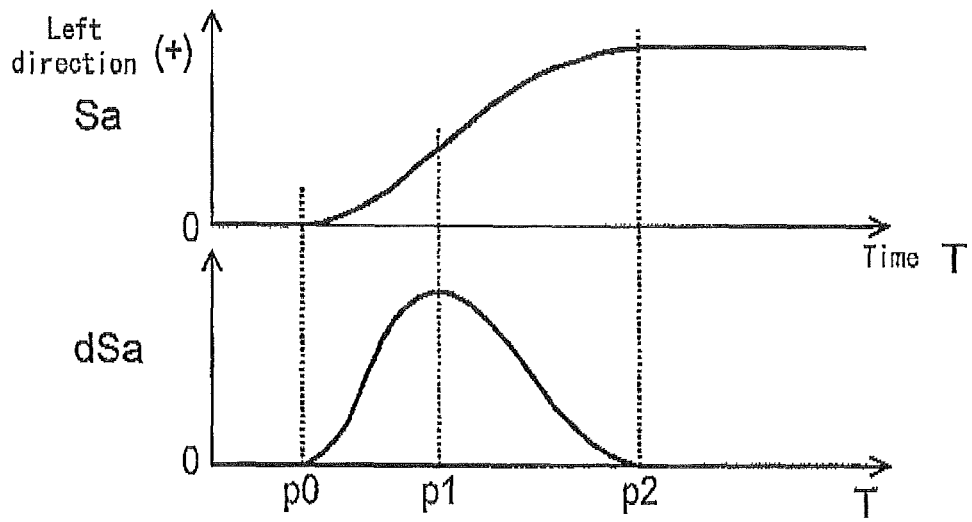
FIG. 2 is a diagram for explaining a J-turn steering operation for abruptly and emergently avoiding an obstacle.

A steering operation to be performed in order to abruptly and emergently avoid an obstacle on a traveling route will be described below with reference to FIGS. 2 and 3. Illustrated in FIG. 2 is a case where a J-turn steering operation, in which a steering wheel SW is abruptly operated in the first direction (e.g. in a left-steering direction), is performed. In this case, the steering operation is started by the driver at time p0, and the steering angle Sa (a steering wheel angle θsw or a steered wheel steering angle δfa) is increased from zero (0: which corresponds to a neutral position of the steering wheel and by which the vehicle is steered to move straight) until time p2. Then, the steering angle Sa is maintained at a constant value. The steering angular velocity dSa (a time derivative of the steering angle) in this case starts rising (increasing) from zero (0) at time p0, reaches a maximum value at time p1 and returns to zero (0) at time p2. The steering operation direction includes a right-steering direction and the left steering direction. Furthermore, the turning direction of the vehicle includes a right-turning direction and a left-turning direction. Generally, the steering operation direction and the turning direction of the vehicle are indicated with positive and negative signs. For example, the left-steering direction and the left-turning direction are indicated with the positive sign. On the other hand, the right-steering direction and the right-turning direction are indicated with the negative sign. However, when explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as a positive value with the plus sign (+).

Figure 3:
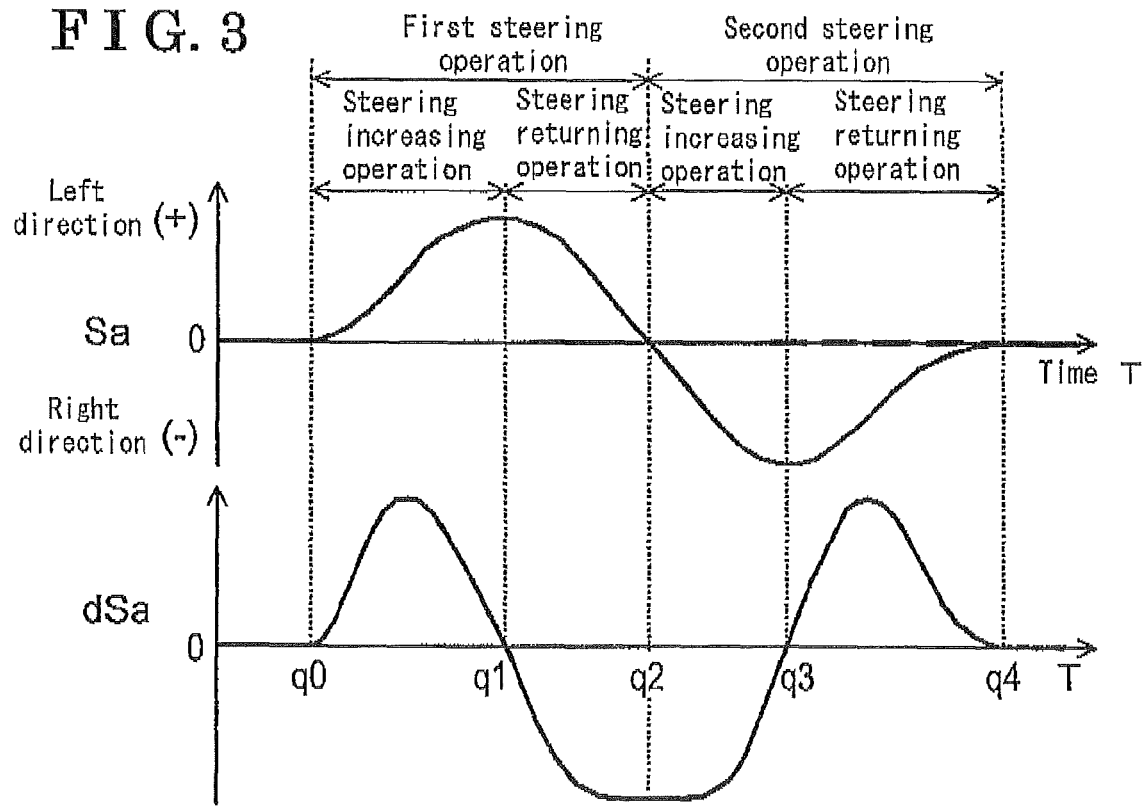
FIG. 3 is a diagram for explaining a lane-change steering operation for abruptly and emergently avoiding the obstacle.

Illustrated in FIG. 3 is a lane-change steering operation which involves the transitional steering operation, in which the steering wheel operation is sequentially performed in the second direction (e.g. in the right-steering direction) after the steering wheel operation is abruptly performed in the first direction (e.g. in the left-steering direction). The first direction (the one direction) is one of a left direction and a right direction, and the second direction (the other direction) is the other one of the left direction and the right direction. In the case illustrated in FIG. 3, the steering operation in the first direction (i.e. in one steering direction) is started by the driver at time q0. Accordingly, the steering angle Sa is increased from zero (0: which corresponds to the neutral position of the steering wheel and which corresponds to the straight movement of the vehicle) in the first steering direction up to time q1. Then, after time q1, the steering angle Sa is returned towards zero (0). Furthermore, the steering operation is sequentially performed in the other direction (i.e. the other steering direction, the second direction) at time q2. Accordingly, the steering angle Sa increases in the second direction from zero (0) through time q2 to q3. After time q3, the steering angle Sa is returned towards zero (0) and the steering angle Sa becomes zero (0) again at time q4. The steering operation to be performed firstly in the first direction is referred to as a "first steering operation". The steering operation to be sequentially performed in the second direction after the "first steering operation" is referred to as a "second steering operation". A steering operation in which the first steering operation and the second steering operation are sequentially performed is referred to as the "transitional steering operation". Additionally, an operation in which the steering angle Sa is distant away from zero (0: the steering neutral position), in other words, the operation in which the degree (an absolute value) of the steering angel Sa increases, is referred to as a "steering increasing" state. On the other hand, an operation in which the steering angle Sa approximates towards zero (0: the steering neutral position), in other words, the operation in which the degree (the absolute value) of the steering angle Sa decreases, is referred to as "steering returning" state. Generally, the vehicle stability may be deteriorated in a case where the steering angular velocity dSa is great while the "steering returning" operation is performed in the first steering operation or while the "steering increasing" operation is performed in the second steering operation. Additionally, a subscript "#" indicates the turning direction. More specifically, "one (1)" indicates that the turning direction corresponds to one direction (i.e. the first direction which corresponds to the first steering operation) and "two (2)" indicates that the turning direction corresponds to the other direction (i.e. the second direction which corresponds to the second steering operation) which is opposite to the one direction (the first direction).

Figure 4:
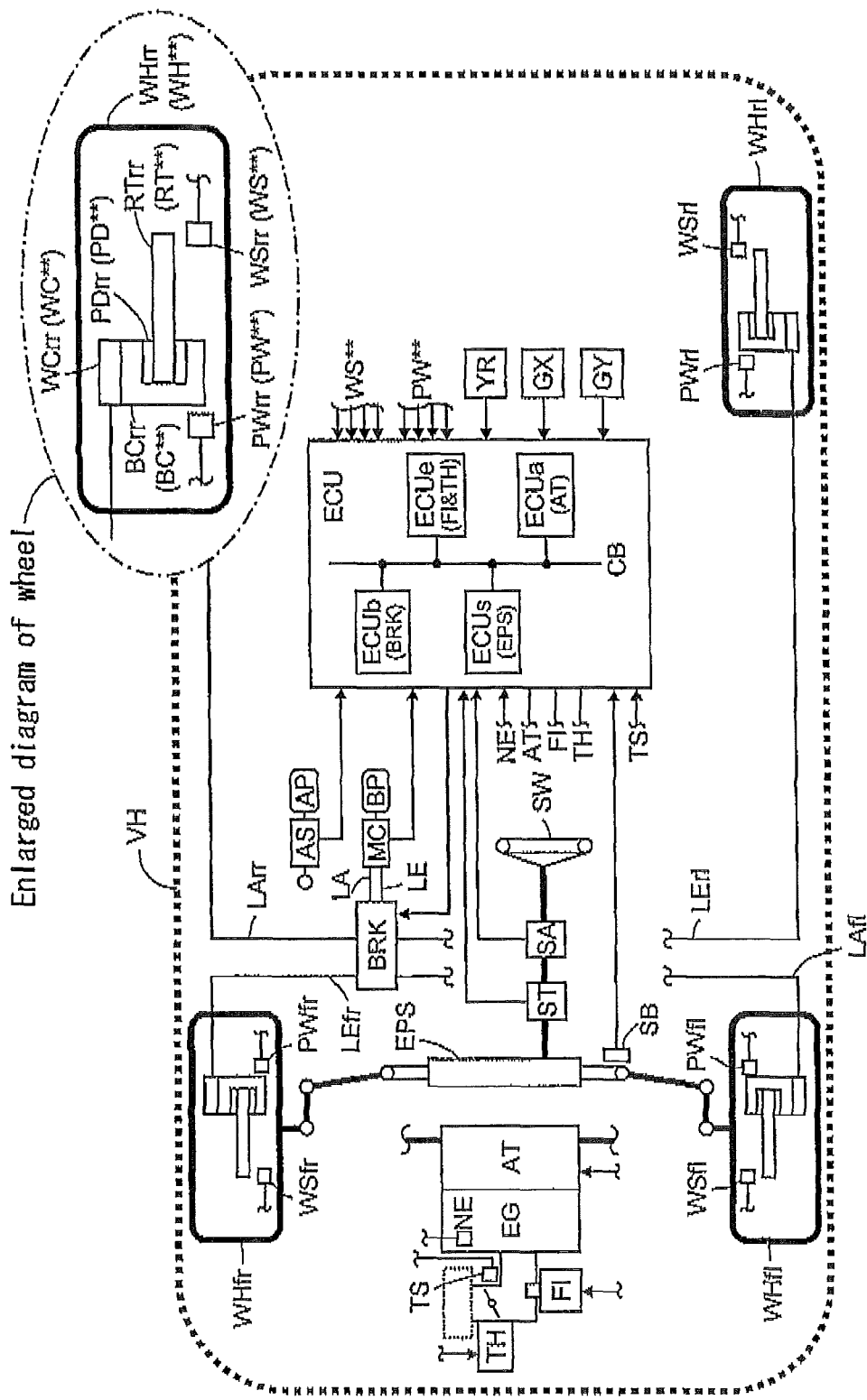
FIG. 4 is a diagram schematically illustrating an entire configuration of a vehicle including the motion control device for the vehicle according to the embodiment.

Illustrated in FIG. 4 is an entire configuration of the vehicle including the motion control device for the vehicle (which will be hereinafter referred to as the device) according to the embodiment. Additionally, symbols '**' are used to comprehensively indicate wheels, specifically, 'fl' indicates a front-left wheel, 'fr' indicate a front-right wheel, 'rl' indicates a rear-left wheel, and 'rr' indicates a rear-right wheel.

The device includes a wheel speed sensor WS for detecting a wheel speed Vw of the wheel WH, a steering wheel angle sensor SA for detecting a rotational angle θsw of the steering wheel SW (from a neutral position zero (0) by which the vehicle is steered to travel straight), a front-wheel steering angle sensor SB for detecting the steering angle δfa of the steered wheels (the front wheels), a steering torque sensor ST for detecting a torque Tsw generated when the driver operates the steering wheel SW, a yaw rate sensor YR for detecting an actual yaw rate Yra acting on the vehicle, a longitudinal acceleration sensor GX for detecting an acceleration (a deceleration) generated in a front-rear direction (a longitudinal direction) of a vehicle body (i.e. a longitudinal acceleration Gxa), a lateral acceleration sensor GY for detecting a lateral acceleration Gya generated in a lateral direction of the vehicle body, a wheel cylinder pressure sensor PW for detecting a brake hydraulic pressure Pw within a wheel cylinder WC, an engine rotational speed sensor NE for detecting a rotational speed Ne of an engine EG, an acceleration operation sensor AS for detecting an operation quantity As of an acceleration operating member AP (an acceleration pedal), a brake operation sensor BS for detecting an operation quantity Bs of a brake operating member (a brake pedal) BP, a shift position sensor HS for detecting a shift position Hs of a shift operating member SF, and a throttle position sensor TS for detecting an opening degree Ts of a throttle valve of the engine EG.

The device further includes a brake actuator BRK for controlling the brake hydraulic pressure, a throttle actuator TH for controlling the throttle valve, a fuel injection actuator FI for controlling an injection of a fuel, and an automatic transmission apparatus AT for controlling a gear change.

Furthermore, the device includes an electronic control unit ECU. The electronic control unit ECU is a microcomputer that includes plural and independent electronic control units ECU (ECUb, ECUs, ECUe and ECUa), which are connected to one another via a communication bus CB. The electronic control unit ECU is electrically connected to the above-mentioned each actuator (the brake actuator BRK and the like) and the above-mentioned each sensor (the wheel speed sensor WS** and the like). Each electronic control unit (ECUb and the like) configured within the electronic control unit ECU executes a specific and dedicated control program. A signal (a sensor value) outputted from each sensor and a signal (an internal calculation value), which is obtained by each electronic control unit (ECUb and the like), are commonly used by each of the electronic control units (ECUb, ECUs, ECUe and ECUa) via the communication bus CB.

More specifically, the brake electronic control unit ECUb is configured so as to execute a slip restricting control (i.e. a braking force and driving force control) such as an anti-skid control (ABS control), a traction control (TCS control) and the like on the basis of the signals outputted from the wheel speed sensor WS, the yaw rate sensor YR, the lateral acceleration sensor GY and the like. Furthermore, the brake electronic control unit ECUb is configured so as to calculate a vehicle speed Vx on the basis of the wheel speed Vw of each wheel WH detected by the corresponding wheel speed sensor WS by using a know method. The steering electronic control unit ECUs is configured so as to execute a known electric power steering control on the basis of the signal outputted from the steering torque sensor ST and the like. The engine electronic control unit ECUe is configured so as to control the throttle actuator TH and the fuel injection actuator FI on the basis of the signal outputted from the acceleration operation sensor AS and the like. The transmission electronic control unit ECUa is configured so as to control a gear ratio of the automatic transmission apparatus AT.

The brake actuator BRK has a known configuration in which plural electromagnetic valves (hydraulic pressure adjusting valves), a hydraulic pump, an electric motor and the like are included. The brake actuator BRK supplies the brake hydraulic pressure corresponding to an operation of the brake operating member BP by the driver to a wheel cylinder WC of each wheel WH in a case where a brake control is not executed in order to apply a brake torque to each wheel WH in response to the operation of the brake operating member BP (the brake pedal). Further, the brake actuator BRK is configured to individually control the brake hydraulic pressure within the wheel cylinder WC of each wheel WH independently of the operation of the brake pedal BP in order to individually and separately adjust the brake torque to be applied to each wheel WH in a case where the brake control, such as the anti-skid control (the ABS control), the traction control (the TCS control) or the vehicle stabilizing control (an electronic stability control, an ESC control) for restricting an understeering and an oversteering of the vehicle and the like, is executed.

Each wheel WH includes the know wheel cylinder WC, a known brake caliper BC, a known brake pad PD and a known brake rotor RT, which serve as the braking means. When the brake hydraulic pressure is applied to the wheel cylinder WC provided at the brake caliper BC, the brake pad PD is pressed against the brake rotor RT while generating a friction force therebetween, thereby applying the brake torque to the wheel WH. In this embodiment, the brake torque is controlled by the brake hydraulic pressure. Alternatively, the control of the brake hydraulic pressure may be achieved by using an electric brake apparatus.

Figure 5:
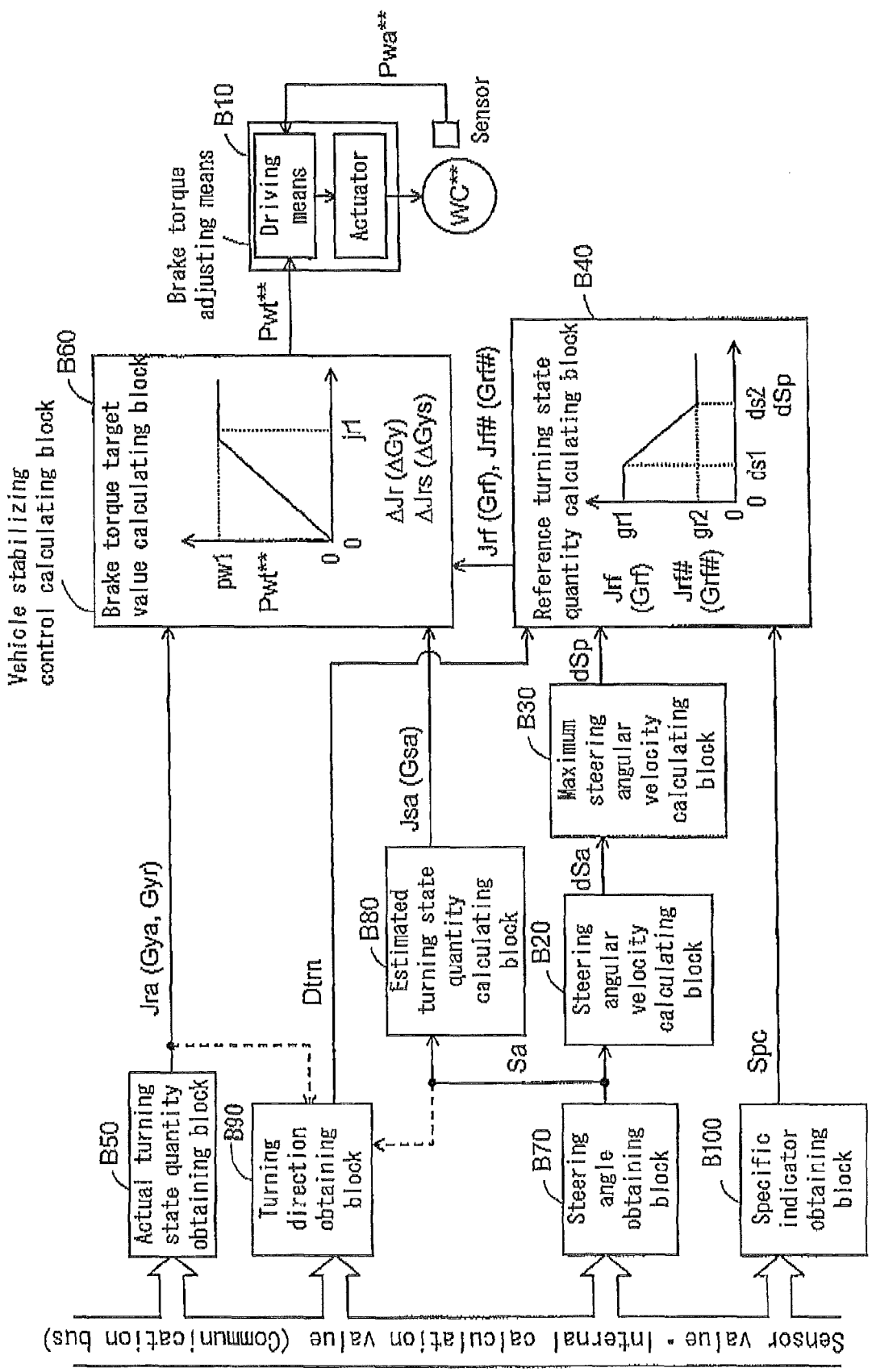
FIG. 5 is a functional block diagram illustrating a processing example of a motion control for the vehicle (a vehicle stabilizing control) according to the embodiment.

Illustrated in FIG. 5 is a functional block diagram of a processing example of a motion control for the vehicle (i.e. the vehicle stabilizing control) according to the embodiment. Additionally, functional blocks having the identical reference numerals as means in FIG. 1 have similar functions as functions of the corresponding means.

In an actual turning state quantity obtaining block B50, the actual turning state quantity Jra acting on the vehicle is obtained on the basis of a sensor value(s) and/or an internal calculation value(s) of other electronic control unit(s), which are obtained via the communication bus CB. For example, the lateral acceleration is used as the turning state quantity. More specifically, the actual lateral acceleration Gya of the vehicle is obtained as the actual turning state quantity Jra. Alternatively, the actual yaw rate Yra of the vehicle may be obtained, so that the actual lateral acceleration Gyr is calculated on the basis of the vehicle speed Vx, which is obtained by a vehicle speed obtaining means, and the actual yaw rate Yra (i.e. Gry=Yra*Vx, where Vx indicates the vehicle speed) as the actual turning state quantity Jra.

In a steering angle obtaining block B70, the steering angle Sa is obtained on the basis of the sensor signal(s) and/or the internal calculation value(s) of other electronic control unit (s), which are obtained via the communication bus CB. The steering angle Sa is determined on the basis of at least one of the steering wheel angle θsw and the steering angle δfa of the steered wheels (the front wheels). In a steering angular velocity calculating block B20, the steering angle Sa is differentiated by time in order to obtain the steering angular velocity dSa. The steering angular velocity dSa is determined on the basis of at least one of the steering wheel angular velocity dθsw and the steered wheel steering angular velocity dδfa. Alternatively, the steering angular velocity dSa may be directly obtained from the sensor(s) and other electronic control unit(s) via the communication bus CB.

In a maximum steering angular velocity calculating block B30, values of the steering angular velocities dSa are continuously stored therewithin, so that the maximum steering angular velocity dSp is calculated on the basis of chronologically-ordered values of the stored steering angular velocities dSa. More specifically, the maximum steering angular velocity dSp[n−1] (the maximum value of the stored steering angular velocities dSa) obtained up to the previous calculation process is stored within the maximum steering angular velocity calculating block B30, so that the maximum value dSp[n−1] is compared with the steering angular velocity dSa[n] obtained in the current calculation process. Then, either the steering angular velocity dSp stored within the maximum steering angular velocity calculating block B30 or the presently obtained steering angular velocity dSa having a greater value is obtained as the maximum steering angular velocity dSp[n] and is stored as a new maximum steering angular velocity dSp[n]. The maximum steering angular velocity dSp is set to zero (0) after the predetermined time tk1 has passed. A subscript [n−1] indicates a previous calculation cycle. On the other hand, a subscript [n] indicates a present calculation cycle.

In a steering direction obtaining block B90, the turning direction Dtrn of the vehicle is obtained on the basis of the sensor signal(s) and/or the internal calculation value(s) of other electronic control unit(s), which are obtained via the communication bus CB. Either the straight-moving direction, the left-turning direction or the right-turning direction is determined as the turning direction Dtrn. More specifically, in the steering direction obtaining block B90, the turning direction Dtm may be determined on the basis of the actual turning state quantity Jra (the actual lateral acceleration Gya or the actual yaw rate Yra). In particular, the turning direction Dtrn may be determined on the basis of the sign of the actual turning state quantity Jra. Alternatively, the turning direction Dtrn may be calculated on the basis of the steering angle Sa, instead of the actual turning state quantity Jra.

In an estimated turning state quantity calculating block B80, the estimated turning state quantity Jsa is calculated on the basis of the steering angle Sa. For example, the estimated lateral acceleration Gsa as the estimated turning state quantity Jsa is calculated on the basis of the vehicle speed Vx, which is obtained by the vehicle speed obtaining means, and the steering angle Sa (i.e. $Gsa=(Vx^2*Sa)/\{L*(1+Kh*Vx^2)\}$, where L indicates a wheelbase of the vehicle and Kh indicates a stability factor).

In a (vehicle) specific indicator obtaining block B100, the vehicle specific indicator Spc relating to at least one of the yawing motion and the rolling motion of the vehicle is obtained on the basis of the sensor signal(s) and/or the internal calculation value(s) of other electronic control unit(s), which are obtained via the communication bus CB. The "(vehicle) specific indicator Spc" is a value, which is calculated on the basis of information relating to at least one of the weight Wvh of the vehicle, the position of the center of gravity of the vehicle (i.e. the distance Lcg from the center of gravity to the front wheel axle, the height Hcg of the center of gravity) and the inertia moment (i.e. the yaw inertia moment Iz, the roll inertia moment Ix). The above-mentioned information (e.g. the weight Wvh of the vehicle and the like) may be obtained by using a known method. For example, a vertical ground load sensor may be provided at each wheel WH**, so that the vehicle weight Wvh and the position of gravity Lcg are obtained on the basis of a signal outputted from each vertical ground sensor. Alternatively, a transfer function of the vehicle may be identified by using the signal outputted from the yaw rate sensor YR, a roll rate sensor or the like, which is provided at the vehicle, thereby obtaining the inertia moments Iz and Ix and the height Hcg of the center of gravity.

The maximum steering angular velocity dSp, the turning direction Dtrn and the specific indicator Spc are inputted into a reference turning state quantity calculating block B40. In the reference turning state quantity calculating block B40, the reference turning state quantity Jrf is calculated on the basis of the maximum steering angular velocity dSp. For example, the lateral acceleration may be used as the turning state quantity. More specifically, the reference lateral acceleration Grf is calculated on the basis of the maximum steering angular velocity dSp as the reference turning state quantity Jrf. In particular, the reference turning state quantity Grf (i,e, the reference turning state quantity Jrf) is calculated by using a preliminarily set calculation map. The calculation map specifies a characteristic of the reference turning state quantity Grf (i.e. the reference turning state quantity Jrf) so that the reference turning state quantity Grf (Jrf) is set to a predetermined value gr1 in a case where the maximum steering angular velocity dSp is smaller than the predetermined value ds1, so that the reference turning state quantity Grf (Jrf) decreases in response to an increase of the maximum steering angular velocity dSp in a case where the maximum steering angular velocity dSp is equal to or greater than the predetermined value ds1 but smaller than a predetermined value ds2 (>ds1), and so that the reference turning state quantity Grf (Jrf) is set to a predetermined value gr2 (<gr1) in a case where the maximum steering angular velocity dSp is equal to or greater than the predetermined value ds2. Accordingly, because the reference turning state quantity Grf (Jrf) is calculated on the basis of the maximum steering angular velocity dSp (i.e. the peak value of the steering angular velocity dSa), the temporal difference between the timing when the steering angular velocity dSa is generated and the timing when the actual turning state quantity Jra is generated may be compensated.

The first reference turning state quantity Jrf1 (e.g. Grf1) to be obtained when the vehicle turns in the first direction is calculated on the basis of the maximum steering angular velocity dSp in the reference turning state quantity calculating block B40. The same calculation map as the calculation map relating to the reference turning state quantity Jrf (Grf) is used for the calculation of the first reference turning state quantity Jrf1 (Grf1). Simultaneously, the second reference turning state quantity Jrf2 (e.g. Grf2) to be obtained when the vehicle turns in the second direction opposite to the first direction is calculated on the basis of the reference turning state quantity Jrf1 (Grf1). More specifically, the second reference turning state quantity Jrf2 (Grf2) to be obtained when the vehicle turns in the second direction is calculated as value whose degree (an absolute value) is equal to the first reference turning state quantity Jrf1 (Grf1) to be obtained when the vehicle turns in the first direction and whose sign is opposite to the sign of the first reference turning state quantity Jrf1 (Grf1).

In a case where the maximum steering angular velocity dSp generated while the vehicle turns in the second direction becomes greater than the maximum steering angular velocity dSp generated while the vehicle turns in the first direction, the maximum steering angular velocity dSp is updated. The second reference turning state quantity Jrf2 (Grf2) is calculated on the basis of the updated maximum steering angular velocity dSp, In the case where the transitional steering operation (i.e. the consecutive steering operation from the first direction to the second direction) is performed, the stability of the vehicle may be deteriorated when the vehicle turns in the second direction. Therefore, in this embodiment, the second reference turning state quantity Jrf2 (Grf2) to be obtained when the vehicle turns in the second direction is preliminarily calculated on the basis of the first reference turning state quantity Jrf1 (Grf1) obtained when the vehicle turns in the first direction, at the timing when the vehicle turns in the first direction.

The characteristic (the calculation map) of the reference turning state quantity calculating block B40 for calculating the reference turning state quantity Jrf (Grf), Jrf# (Grf#) may be adjusted on the basis of the (vehicle) specific indicator Spc. The calculation map based on the vehicle specific indicator Spc will be described below with reference to FIG. 6.

Figure 6:
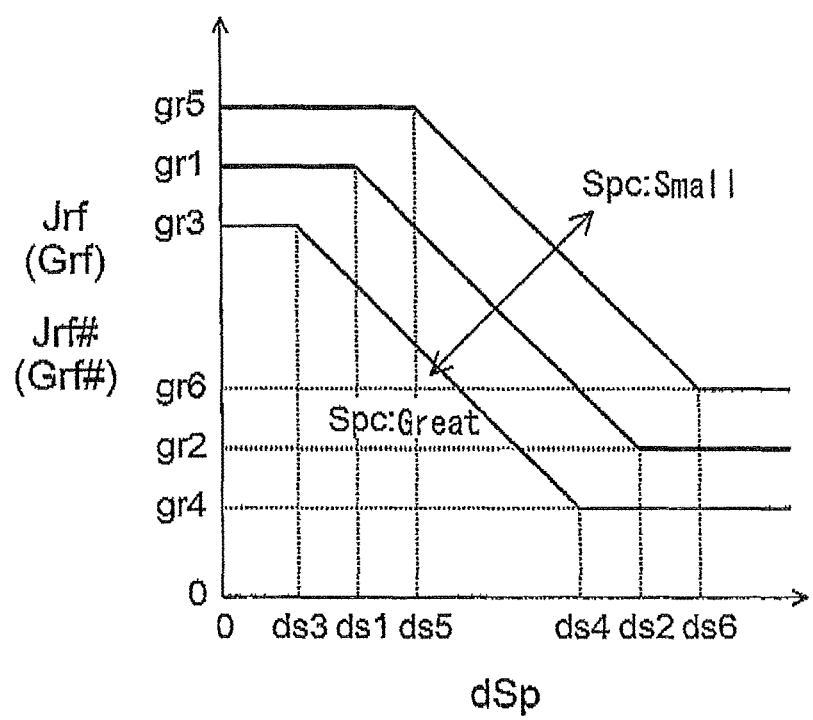
FIG. 6 is a calculation map illustrating another processing example of a reference turning state quantity determining calculation illustrated in FIG. 5 according to the embodiment.

As illustrated in FIG. 6, in a case where the vehicle specific indicator Spc is great, the reference turning state quantity Jrf (Grf), Jrf# (Grf#) is adjusted to be a relatively small value. On the other hand, in a case where the vehicle specific indicator Spc is small, the reference turning state quantity Jrf (Grf), Jrf# (Grf#) is adjusted to be a relatively great value. The "specific indicator Spc being great" means that a value of at least one of the vehicle weight Wvh, the distance Lcg between the front wheel axle and the center of gravity, the height Hcg of the center of gravity, the yaw inertia moment Iz and the roll inertia moment Iz is relatively great. On the other hand, the "specific indicator Spc being small" means that a value of at least one of the vehicle weight Wvh, the distance Lcg between the front wheel axle and the center of gravity, the height Hcg of the center of gravity, the yaw inertia moment Iz and the roll inertia moment Iz is relatively small.

More specifically, in the case where the vehicle specific indicator Spc is great, the calculation map illustrated in FIG. 6 specifies the characteristic of the reference turning state quantity Jrf (Grf), Jrf# (Grf#) relative to the calculation map of the reference turning state quantity calculating block B40 illustrated in 5 in a manner where the reference turning state quantity Jrf (Grf), Jrf# (Grf#) is set to a predetermined value gr3 (<gr1) in a case where the maximum steering angular velocity dSp is smaller than a predetermined value ds3 (<ds1), so that the reference tuning state quantity Jrf (Grf), Jrf# (Grf#) decreases in response to the increase of the maximum steering angular velocity dSp in a case where the maximum steering angular velocity dSp is equal to or greater than the predetermined value ds3 but smaller than a predetermined value ds4 (>ds3) (<ds2), and so that the reference turning state quantity Jrf (Grf), Jrf# (Grf#) is set to a predetermined value gr4 (<gr3) (<gr2) in a case where the maximum steering angular velocity dSp is equal to or greater than the predetermined value ds4. On the other hand, in the case where the vehicle specific indicator Spc is small, the calculation map is set so as to specify the characteristics of the reference turning state quantity Jrf (Grf), Jrf# (Grf#) so that the reference turning state quantity Jrf (Grf), Jrf# (Grf#) is set to a predetermined value gr5 (>gr1) in a case where the maximum steering angular velocity dSp is smaller than a predetermined value ds5 (>ds1), so that the reference turning state quantity Jrf (Grf), Jrf# (Grf#) is decreased in response to the increase of the maximum steering angular velocity dSp in a case where the maximum steering angular velocity dSp is equal to or greater than the predetermined value ds5 but smaller than a predetermined value ds6 (>ds5) (>ds2), and so that the reference turning state quantity Jrf (Grf), Jrf# (Grf#) is set to a predetermined value gr6 (<gr5) (>gr2) in a case where the maximum steering angular velocity dSp is equal to or greater than the predetermined value ds6.

The stability of the vehicle, whose vehicle specific indicator Spc is great, is likely to be deteriorated. Hence, in the case where the vehicle specific indicator Spc is great, the reference turning state quantity Jrf (Grf), Jrf# (Grf#) is adjusted to be a relatively small value on the basis of the calculation map illustrated in FIG. 6. Accordingly, because the vehicle stabilizing control is started while the actual turning state quantity is maintained at a low level, the vehicle stability is surely ensured. On the other hand, the stability of the vehicle, whose vehicle specific indicator Spc is small, is likely to be ensured. Therefore, in the case where the vehicle specific indicator Spc is small, the reference turning state quantity Jrf (Grf), Jrf# (Grf#) is adjusted to be a relatively great value on the basis of the calculation map illustrated in FIG. 6. Accordingly, because the vehicle stability control is started while the actual turning state quantity is maintained at a high level, an unnecessary intervention of the control may be avoided.

The reference turning state quantity Jrf (Grf), Jrf# (Grf#), the actual turning state quantity Jra (e.g. Gya, Gyr) and the estimated turning state quantity Jsa (Gsa) are inputted into a vehicle stabilizing control calculating block B60. In the vehicle stabilizing control calculating block B60, the target value Pwt of the brake torque to be applied to the wheel WH in order to maintain the stability of the vehicle is calculated on the basis of the reference turning state quantity Jrf (Grf), Jrf# (Grf#), the actual turning state quantity Jra (e.g. Gya, Gyr) and the estimated turning state quantity Jsa (Gsa).

The deviation $\Delta$Jr between the actual turning state quantity Jra and the reference turning state quantity Jrf (Jrf#) (e.g. the deviation $\Delta$Gy between the actual turning state quantity Gya, Gyr and the reference turning state quantity Grf (Grf#)) is calculated in the vehicle stabilizing control calculating block B60. Then, the brake torque target value Pwt is calculated on the basis of the actual turning state quantity deviations $\Delta$Jr (=Jra−Jrf) (e.g. $\Delta$Gy (=Gya−Grf)) by using a preliminarily set calculation map. The calculation map is set so as to specify a characteristic of the brake torque target value Pwt so that the target value Pwt is increased from zero (0) in response to an increase of the actual turning state quantity deviation $\Delta$Jr ($\Delta$Gy) from zero (0). The supply of the brake torque to the wheel WH is started when the actual turning state quantity Jra (e.g. Gya, Gyr) exceeds the reference turning state quantity Jrf (Grf), Jrf# (Grf#). Additionally, the brake torque target value Pwt** is determined on the basis of deviation $\Delta$Jr between the actual turning state quantity Jra and the reference turning state quantity Jrf (Jrf#), the deviation $\Delta$Gy between the actual turning state quantity Gya, Gyr and the reference turning state quantity Grf (Grf#).

Furthermore, a deviation (a difference) $\Delta$Jrs ($\Delta$Gys) between the estimated turning state quantity Jsa (Gsa) and the reference turning state quantity Jrf (Grf), Jrf# (Grf#) is calculated in the vehicle stabilizing control calculating block B60. The brake torque target value Pwt to be applied to the wheel WH is calculated on the basis of the estimated turning state quantity deviation $\Delta$Jrs ($\Delta$Gys) by using a calculation map similar to the calculation map mentioned above. More specifically, the calculation map is set so as to specify a characteristic of the target value Pwt so that the target value Pwt increases from zero (0) in response to an increase of the estimated turning state quantity deviation $\Delta$Jrs (e.g. $\Delta$Gys) from zero (0). In this case, the supply of the brake torque to the wheel WH is started when the estimated turning state quantity Jsa (e.g. Gsa) exceeds the reference turning state quantity Jrf (Grf), Jrf# (Grf#). Also, the target value Pwt of the brake torque to be applied to the wheel WH may be determined on the basis of the actual turning state quantity deviation $\Delta$Jr ($\Delta$Gy). Accordingly, because the start of the vehicle stabilizing control and/or the calculation of the brake torque target value Pwt is executed on the basis of plural turning state quantity deviations $\Delta$Jr ($\Delta$Gy) and $\Delta$Jrs ($\Delta$Gys), the reliability in the execution of the vehicle stabilizing control may be enhanced.

In a brake torque adjusting means B10 (which corresponds to the braking means), a driving means of the brake actuator BRK (e.g. an electric motor for a hydraulic pressure pump, a driving means of a solenoid valve and the like) is controlled on the basis of the brake torque target value Pwt. In this embodiment, a sensor (e.g. the pressure sensor PW) for detecting an actual value Pwa of the brake torque in response to the target value Pwt is provided at the wheel WH in order to control the driving means so that the actual value Pwa corresponds to the target value Pwt on the basis of the target value Pwt and the actual value Pwa**.

Figure 7:
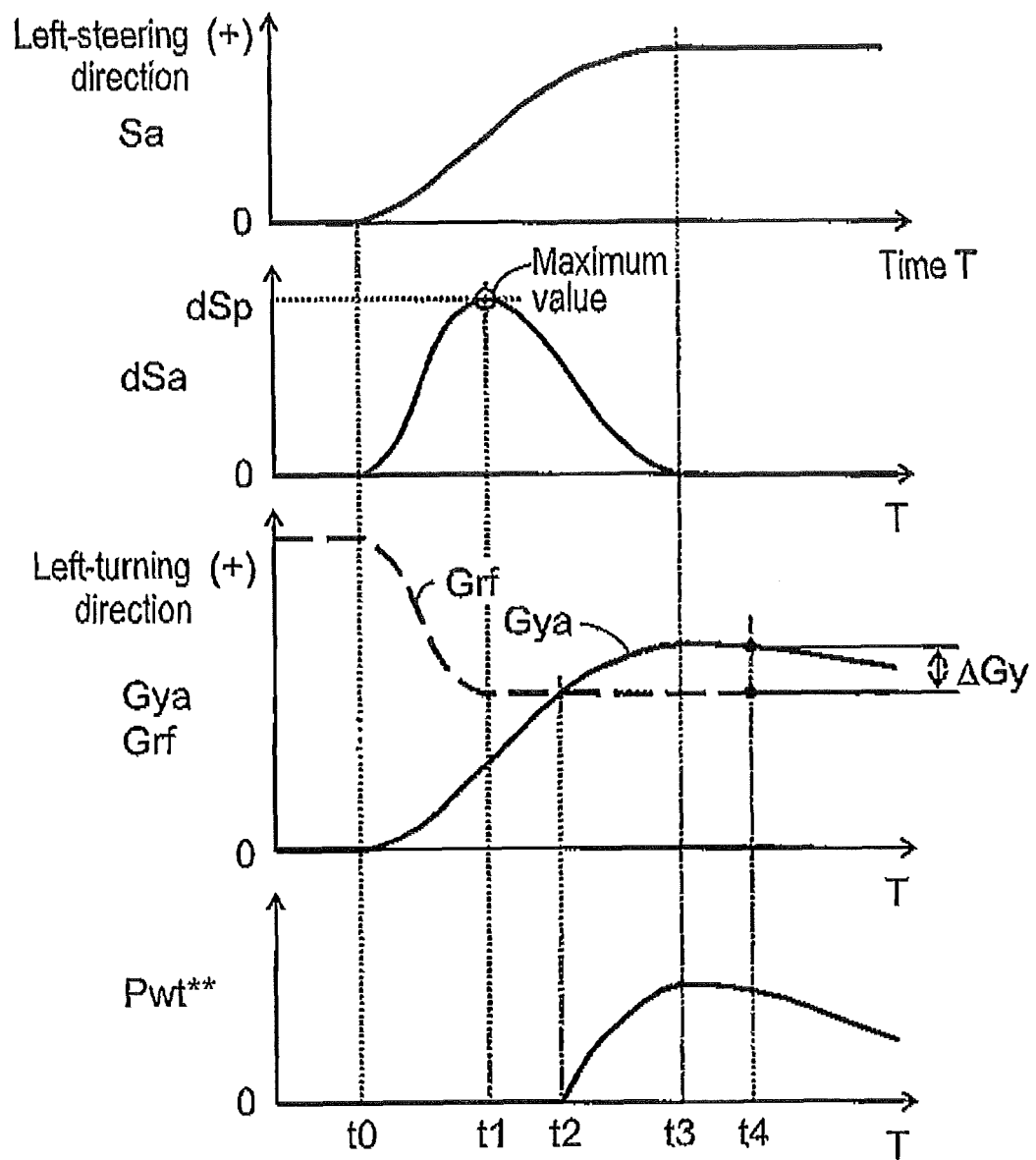
FIG. 7 is a diagram for explaining an advantage and a merit to be obtained in the case where the J-turn steering operation is performed according to the embodiment.
Figure 8:
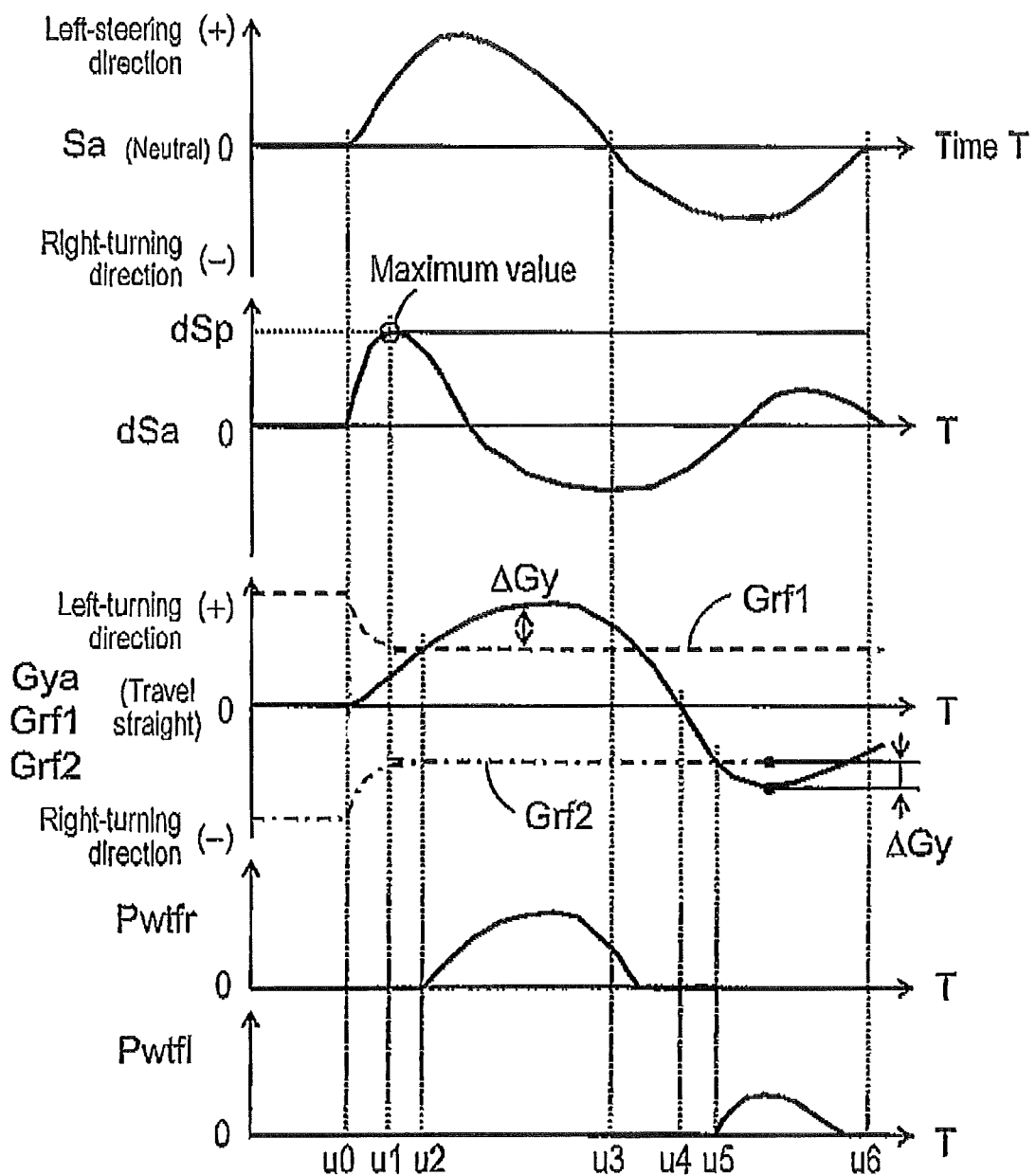
FIG. 8 is a diagram for explaining an advantage and a merit to be obtained in the case where the lane-change steering operation is performed according to the embodiment.

Advantages and merits according to the embodiment will be described below with reference to FIGS. 7 and 8. More specifically, the advantages and merits according to the embodiment in the case where the lateral acceleration is used as the turning state quantity will be described below as a representative example with reference to FIGS. 7 and 8.

According to the device that controls the stability of the vehicle based on plural turning state quantities, the phase shift (i.e. the temporal difference) between plural turning state quantities needs to be compensated for the vehicle at which a relatively large inertia moment is likely to be generated (e.g. the large-sized commercial vehicle). Therefore, in this embodiment, the reference turning state quantity (the reference turning state quantity Jrf and the like), which is used as a reference for the vehicle stabilizing control, may be calculated on the basis of the maximum value dSp of the steering angular velocity. Accordingly, because the vehicle stability control is executed in view of the maximum steering angular velocity dSp, the above-described phase shift may be compensated.

Additionally, the steering operation direction includes the right-steering direction and the left-steering direction. The turning direction of the vehicle includes the right-turning direction and the left-turning direction. Generally, the steering operation direction and the turning direction of the vehicle are indicated with positive and negative signs (e.g. (+) and (−)). For example, the left-steering direction and the left-turning direction are indicated with the positive sign. On the other hand, the right-steering direction and the right-turning direction are indicated with the negative sign. However, when explaining the magnitude relation of values or when explaining the increase and decrease of the value in view of the steering directions and the turning direction, which are indicated by the plus and minus signs, the explanation may become too complicated. Therefore, values will be described (explained) on the basis of the magnitude relation of the absolute values or the increase and the decrease of the absolute value unless otherwise specified. Additionally, the predetermined value is set as the positive value with the plus sign (+). Furthermore, the symbols '**' are used to comprehensively indicate wheels, specifically, 'fl' indicates the front-left wheel, 'fr' indicate the front-right wheel, 'rl' indicates the rear-left wheel, and 'rr' indicates the rear-right wheel. Furthermore, the symbol "#" indicates the corresponding turning direction. For example, "1" indicates that the turning direction corresponds to the first direction and "2" indicates that the turning direction corresponds to the second direction.

Advantages and merits to be obtained when the J-turn steering operation is performed will be described below with reference to FIG. 7. In this case, the abrupt steering operation in the first direction (i.e. the left direction) is started at time t0 and the steering angle Sa rapidly increases. The steering angular velocity dSa is obtained by the steering angular velocity obtaining means B20, so that the maximum steering angular velocity dSp is calculated on the basis of the steering angular velocity dSa. For example, data relating to the steering angular velocity dSa are stored within the determining means B40 in the chronological order, so that the maximum value within the data is calculated as the maximum steering angular velocity dSp. More specifically, the maximum steering angular velocity dSp obtained up to the previous calculation cycle is stored within the determining means B40 and the steering angular velocity dSa obtained in the current calculation cycle is compared with the stored maximum steering angular velocity dSp. Then, either the stored maximum steering angular velocity dSp or the steering angle velocity dSa having a greater value is calculated as the maximum steering angular velocity dSp and is newly stored as the maximum steering angular velocity dSp.

Then, the reference lateral acceleration Grf (which is indicated by a broken line in FIG. 7) is calculated on the basis of the maximum steering angular velocity dSp. More specifically, the reference lateral acceleration Grf is calculated so that, in the case where the maximum steering angular velocity dSp is relatively small, the reference lateral acceleration Grf is calculated to a great value, or, in a case where the maximum steering angular velocity dSp is relatively great, the reference lateral acceleration Grf is calculated to a small value.

The supply of the brake torque to the wheel WH is started when (a degree of) the actual lateral acceleration Gya exceeds (a degree of) the reference lateral acceleration Grf (time t2). A supply amount of the brake torque (i.e. the brake torque target value Pwt) is calculated on the basis of the deviation $\Delta Gy$ between (the degree of) the actual lateral acceleration Gya and (the degree of) the reference lateral acceleration Grf (i.e. $\Delta Gy=Gya-Grf$).

Generally, the temporal difference occurs between the timing when the actual lateral acceleration Gya reaches the maximum value (e.g. the actual lateral acceleration Gya reaches the maximum value (becomes saturated) at time t3) and the timing when the steering angular velocity dSa reaches the maximum value (the peak value) (at time t1) in the case where the abrupt steering operation is performed. Accordingly, in this embodiment, the reference lateral acceleration Grf is calculated on the basis of the maximum steering angular velocity dSp, so that the temporal difference may be compensated.

Advantages and merits to be obtained in the case where the lane-change steering operation (i.e. the transitional steering operation) is performed will be described below with reference to FIG. 8. In this case, the steering wheel SW is abruptly steered in the left direction (i.e. the first direction) at time u0 and then, the steering wheel SW is sequentially steered in the right direction (i.e. the second direction) at time u3.

In this case, the steering angular velocity dSa is obtained by the steering angular velocity obtaining means B20, so that the maximum steering angular velocity dSp obtained in the case where the vehicle turns in the first direction (i.e. the left direction) is calculated on the basis of the steering angular velocity dSa in the same manner as mentioned above. Then, the first reference lateral acceleration Grf1 (which is indicated by a broken line in FIG. 8) in the first turning direction (i.e. the left direction) is calculated on the basis of the maximum steering angular velocity dSp. Simultaneously, the second reference lateral acceleration Grf2 (=-Grf1) (which is indicated by a dash-and-dot line in FIG. 8) in the second turning direction (i.e. the right direction) is calculated on the basis of the maximum steering angular velocity dSp in the first turning direction (i.e. the left direction). In the case where the maximum steering velocity dSp in the second turning direction becomes greater than the maximum steering angular velocity dSp in the first direction, the maximum steering angular velocity dSp is updated. In this case, the second reference lateral acceleration Grf2 is calculated on the basis of the updated maximum steering angular velocity dSp.

The supply of the brake torque to the wheel WH is started when (the degree of) the actual lateral acceleration Gya exceeds (a degree of) the first reference lateral acceleration Grf1 (at time u2) and when the actual lateral acceleration Gya exceeds (a degree of) the second reference lateral accelerations Grf2 (at time u5). The supply amount Pwt of the brake torque (i.e. the brake torque target value Pwr) is calculated on the basis of the deviation $\Delta Gy$ between (the degree of) the actual lateral acceleration Gya and (the degree of) the first and second reference lateral acceleration Grf1 and Grf2 (i.e. $\Delta Gy=Gya-Grf$).

In the case where the vehicle is abruptly steered in one direction (the first direction) then, sequentially in the other direction (the second direction), the stability of the vehicle is likely to be deteriorated while the vehicle turns in the second direction. Therefore, in this embodiment, the reference turning state quantity in the second direction (i.e. the second reference turning state quantity) is preliminarily set while the vehicle turns in the first direction. As a result, the vehicle stability may be surely ensured.

According to the embodiment, the determining means B40 determines the reference turning state quantity Jrf (e.g. Grf), Jrf# (e.g. Grf#) in the manner where the greater the maximum steering angular velocity dSp is, the smaller value the reference turning state quantity Jrf (Grf), Jrf# (Grf#) is determined to be, alternatively, the smaller the maximum steering angular velocity dSp is, the greater value the reference turning state quantity Jrf (Grf), Jrf# (Grf#) is determined to be.

According to the embodiment, the maximum steering angular velocity calculating means B30 sets the maximum steering angular velocity dSp to zero (0) after the predetermined time tk1 has passed.

According to the embodiment, the control means B60 controls the braking means B10 when the actual turning state quantity Jra (e.g. Gya, Gyr) exceeds the reference turning state quantity Jrf (Grf), Jrf# (Grf#) in order to start applying the brake torque to the wheel HW**.

According to the embodiment, the control means B60 calculates a deviation $\Delta Jr$ (e.g. $\Delta Gy$) between the actual turning state quantity Jra (Gya, Gyr) and the reference turning state quantity Jrf (Grf), Jrf# (Grf#) and determines the target value Pwt** of the brake torque on the basis of the deviation $\Delta Jr$ ($\Delta Gy$).

According to the embodiment, the device further includes the steering angle obtaining means B70 for obtaining the steering angle Sa of the vehicle and the estimated turning state quantity calculating means B80 for calculating the estimated turning state quantity Jsa (e.g. Gsa) on the basis of the steering angle Sa. The control means B60 controls the braking means B10 when the estimated turning state quantity Jsa (Gsa) exceeds the reference turning state quantity Jrf (Grf), Jrf# (Grf#) in order to start applying the brake torque to the wheel WH**.

According to the embodiment, the device further includes the turning direction obtaining means B90 for obtaining the turning direction Drtn of the vehicle. The determining means B40 determines the reference turning state quantity Jrf1 (e.g. Grf1) obtained in the case where the vehicle turns in the first direction (i.e. either the right direction or the left direction) and determines the reference turning state quantity Jrf2 (e.g. Grf2) obtained in the case where the vehicle turns in the second direction (i.e. the direction opposite to the first direction) on the basis of the turning state quantity Jrf (Grf1) obtained in the case where the vehicle turns in the first direction.

According to the embodiment, the device further includes the specific indicator obtaining means B100 for obtaining the specific indicator Spc relating to at least one of the yawing motion and the rolling motion of the vehicle, wherein the determining means B40 determines the reference turning state quantity Jrf (Grf), (Jrf# (Grf#) on the basis of the specific indicator Spc.

According to the embodiment, the determining means B40 adjusts the reference turning state quantity Jrf (Grf), Jrf# (Grf#) to be a relatively small value in the case where the specific indicator Spc is great, or the determining means B40 adjusts the reference turning state quantity Jrf (Grf), Jrf# (Grf#) to be a relatively great value in the case where the specific indicator Spc is small.

Accordingly, because the reference turning state quantity (Jrf and the like) is calculated on the basis of the maximum steering angular velocity dSp (i.e. the steering angular velocity maximum value) so that the vehicle stability control is executed on the basis of a comparison between the reference turning state quantity and the actual turning state quantity (Jra and the like), the phase difference between when the plural state quantities is compensated. As a result, an accurate control may be executed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle having a braking means for applying a brake torque to a wheel of the vehicle and maintaining a traveling stability of the vehicle by controlling the braking means, the motion control for the vehicle, comprising:
   a steering angular velocity obtaining means for obtaining a steering angular velocity of the vehicle;
   a maximum steering angular velocity calculating means for calculating, on the basis of the steering angular velocity, a maximum steering angular velocity over a period of time corresponding to a duration of 1) a J-turn steering operation in which a steering wheel is abruptly operated in one direction, or 2) a lane-change steering operation in which the steering wheel operation is sequentially performed in the other direction after the steering wheel operation is abruptly performed in one direction;
   a determining means for determining a reference turning state quantity on the basis of the maximum steering angular velocity, wherein the determining means determines the reference turning state quantity in a manner where the greater the maximum steering angular velocity is, the smaller value the reference turning state quantity is determined to be, alternatively, the smaller the maximum steering angular velocity is, the greater value the reference turning state quantity is determined to be;
   an actual turning state quantity obtaining means for obtaining an actual turning state quantity of the vehicle; and
   a control means for controlling the brake torque on the basis of the reference turning state quantity and the actual turning state quantity, wherein the control means controls the braking means when the actual turning state quantity exceeds the reference turning state quantity in order to start applying the brake torque to the wheel.

2. The motion control device for the vehicle according to claim 1, wherein the maximum steering angular velocity calculating means sets the maximum steering angular velocity to zero (0) after a predetermined time has passed.

3. The motion control device for the vehicle according to claim 2 further comprising a steering angle obtaining means for obtaining a steering angle of the vehicle and an estimated turning state quantity calculating means for calculating an estimated turning state quantity on the basis of the steering angle, wherein the control means controls the braking means when the estimated turning state quantity exceeds the reference turning state quantity in order to start applying the brake torque to the wheel.

4. The motion control device for the vehicle according to claim 2 further comprising a turning direction obtaining means for obtaining a turning direction of the vehicle, wherein the determining means determines the reference turning state quantity obtained in a case where the vehicle turns in a first direction and determines the reference turning state quantity obtained in a case where the vehicle turns in a second direction on the basis of the turning state quantity obtained in the case where the vehicle turns in the first direction.

5. The motion control device for the vehicle according to claim 2 further comprising a specific indicator obtaining means for obtaining a specific indicator relating to at least one of a yawing motion and a rolling motion of the vehicle, wherein the determining means determines the reference turning state quantity on the basis of the specific indicator.

6. The motion control device for the vehicle according to claim 5, wherein the determining means adjusts the reference turning state quantity to be a relatively small value in a case where the specific indicator is great, or the determining means adjusts the reference turning state quantity to be a relatively great value in a case where the specific indicator is small.

7. The motion control device for the vehicle according to claim 1, wherein the control means calculates a deviation between the actual turning state quantity and the reference turning state quantity and determines a target value of the brake torque on the basis of the deviation.

8. The motion control device for the vehicle according to claim 7 further comprising a steering angle obtaining means for obtaining a steering angle of the vehicle and an estimated turning state quantity calculating means for calculating an estimated turning state quantity on the basis of the steering angle, wherein the control means controls the braking means when the estimated turning state quantity exceeds the reference turning state quantity in order to start applying the brake torque to the wheel.

9. The motion control device for the vehicle according to claim 1 further comprising a steering angle obtaining means for obtaining a steering angle of the vehicle and an estimated turning state quantity calculating means for calculating an estimated turning state quantity on the basis of the steering angle, wherein the control means controls the braking means when the estimated turning state quantity exceeds the reference turning state quantity in order to start applying the brake torque to the wheel.

10. The motion control device for the vehicle according to claim 1 further comprising a turning direction obtaining means for obtaining a turning direction of the vehicle, wherein the determining means determines the reference turning state quantity obtained in a case where the vehicle turns in a first direction and determines the reference turning state quantity obtained in a case where the vehicle turns in a second direction on the basis of the turning state quantity obtained in the case where the vehicle turns in the first direction.

11. The motion control device for the vehicle according to claim 1 further comprising a specific indicator obtaining means for obtaining a specific indicator relating to at least one of a yawing motion and a rolling motion of the vehicle, wherein the determining means determines the reference turning state quantity on the basis of the specific indicator.

12. The motion control device for the vehicle according to claim 11, wherein the determining means adjusts the reference turning state quantity to be a relatively small value in a case where the specific indicator is great, or the determining means adjusts the reference turning state quantity to be a relatively great value in a case where the specific indicator is small.

13. The motion control device for the vehicle according to claim 1, wherein a temporal difference occurs between a timing when the actual turning state quantity reaches its maximum value and a timing when the steering angular velocity reaches the maximum steering angular velocity in a case where the steering wheel operation is abruptly performed.

* * * * *